3,352,941
CATALYST REGENERATION WITH HYDROGEN IN AN ISOMERIZATION PROCESS

William Schoen, Houston, Tex., and John A. Ridgway, Jr., La Porte, Ind., assignors to Standard Oil Company, Chicago, Ill., a corporation of Indiana
No Drawing. Filed Feb. 23, 1965, Ser. No. 434,629
12 Claims. (Cl. 260—683.74)

This application is a continuation-in-part of our co-pending application Ser. No. 45,541, filed July 27, 1960, now abandoned.

This invention relates to processes utilizing solid particulate aluminum halide-adsorbent support catalysts. More particularly, the invention relates to a procedure for regenerating used catalyst of the type consisting essentially of the reaction product of aluminum chloride and hydroxyl groups of surface-hydroxyl-containing adsorbent solid.

The aluminum halides have been used as catalysts for conversions of organic compounds for many years. Aluminum halides per se are inconvenient to use as catalyst because of special difficulties encountered with addition of the catalyst and good contacting of the catalyst with the reactants. In order to obviate some of these difficulties, aluminum halide catalysts have been used in conjunction with complex forming materials such as hydrocarbons which produce liquid complexes possessing catalytic activity. These liquid complexes have introduced other problems. Another form in which aluminum halide has been utilized has been as a so-called solid catalyst wherein aluminum halide is positioned on the surface of a particulate adsorbent material such as bauxite. These solid aluminum halide-adsorbent catalysts have been particularly used where continuous flow operation is desired.

Used catalyst is defined as one possessing less catalytic activity than fresh catalyst of this type, which loss in activity has resulted from use in a conversion process involving a hydrocarbon feed. The used catalyst may be derived from any of the processes involving a hydrocarbon feed which are catalyzed by aluminum halides and, particularly, by solid catalysts of the type herein defined. The used catalyst from conversions involving saturated hydrocarbons is particularly amenable to the regeneration process of the invention. A preferred source of used catalyst is that from the isomerization of lower molecular weight paraffins and cycloparaffins, namely, paraffinic hydrocarbons containing from 4 to 8 carbon atoms, which can be rearranged, and cycloparaffins containing from 6 to 9 carbon atoms, which can be rearranged. Some isomerization processes require the presence of a cycloparaffin inhibitor, in which case the hydrocarbon feed may contain not only the defined lower molecular weight paraffins but also cycloparaffins containing from 5 to 9 carbon atoms. Used catalyst from isomerization of n-butane, n-pentane, and n-hexane is a preferred source of catalyst to the regeneration process.

It is to be understood that the regeneration process of the invention is applicable to catalysts of the defined type which have lost some degree of catalytic activity and the regeneration may be only a partial restoration of this lost activity. The point at which a catalyst is considered to be "used" is not only a matter of ability to catalyze the reaction but also a matter of economics. It may be desirable to regenerate a fairly active catalyst back to essentially fresh catalyst activity rather than permit the catalyst to pass to a much lower level of activity and regenerate to a less than fresh activity. Also, it is to be understood some used catalyst may not be able to be returned to full activity; the nature of the process, the nature of the surface-hydroxyl-containing adsorbent solid, all these have a bearing on the ability of the used catalyst to be regenerated.

It has been discovered that used catalyst of this type can be regenerated to possess a substantially greater activity than the used catalyst by treatment with hydrogen gas at a temperature from about 150° F. to about 600° F., and a hydrogen pressure of from about 50 p.s.i. to about 3000 p.s.i. for a time sufficient to obtain the desired degree of activity increase. The hydrogen gas preferably includes hydrogen chloride. A time in the range of about 6 to 72 hours is usually sufficient to effect a suitable degree of activity restoration or regeneration.

The preferred catalyst for use in our process, broadly considered, is an aluminum halide positioned on surface-hydroxyl-containing adsorbent solid and associated with hydrogen halide. It is preferred that the hydrogen halide correspond to the particular aluminum halide used. Aluminum chloride is the preferred aluminum halide and will be used in the subsequent discussion for the purpose of illustration. More specifically, the preferred catalyst is the reaction product of aluminum chloride with surface hydroxyl groups of surface-hydroxyl-containing adsorbent solid associated with hydrogen chloride.

The term "surface-hydroxyl-containing adsorbent solid" includes the various forms of silica gel and the various alumina materials, natural and synthetic, which have a substantial portion of the surface existing in the hydroxyl form, as opposed to the "dehydrated" oxide form. No adsorbed water, as such, should be present. Aluminas which can be treated to produce the required surface hydroxyl groups are gamma, eta, and chi forms of alumina. The surface-hydroxyl-containing adsorbent solids are not significantly active for hydrocarbon isomerization, under the other conditions of the process, nor is the aluminum chloride reaction product alone significantly active; yet, the reaction product, when conjoined with HCl produces more hydrocarbon conversion than do the same amounts of aluminum chloride and HCl alone, or surface-hydroxyl-containing adsorbent solid either alone or with HCl, under the other conditions of the process.

Aluminum chloride can exist on the surface of alumina in three forms: reacted with surface hydroxyl groups to form —O—$AlCl_2$ groups, chemisorbed $AlCl_3$ monomer, and as physically adsorbed aluminum chloride. In the case of silica gel, aluminum chloride can exist on the surface in only two forms: reacted with surface hydroxyl groups to form —O—$AlCl_2$ groups, and physically adsorbed aluminum chloride. The reacted and chemisorbed forms associate with HCl and thus form an active catalyst species; however, the chemisorbed monomer form is unstable and the aluminum chloride in this form tends to be desorbed by process and/or regeneration fluids, thus destroying this catalyst species. This species can be maintained or replaced, however, by replacing the aluminum chloride, e.g. in solution in the process stream. On the other hand, the reacted form is quite stable and, for example, the —O—$AlCl_2$ groups are not destroyed by atmospheric pressure inert gas purge at temperatures as high as 700° F., far above the sublimation temperature of aluminum chloride. The physically adsorbed form is even more unstable than the chemisorbed monomer form and is not a practical catalyst component.

The surface-hydroxyl-containing adsorbent solid should have a substantial amount of surface area. Only those pores in the adsorbent solid having diameters greater than about 35 Angstrom units (35 A.) are utilized in forming the catalyst, therefore it is the surface area of the pores larger than about 35 A. which is important. The surface of adsorbent solid pores having diameters greater than about 35 A. is termed herein "effective surface" and the term "effective surface area" is used herein to mean the total surface area of an adsorbent solid minus the surface area attributable to surface within pores having diameters less than about 35 A. The surface areas and pore diameters herein are those which are determined by nitrogen adsorption techniques. It is desirable that the surface-hydroxyl-containing adsorbent solid have an effective surface area in the range of about 25–700 square meters per gram (sq. m./gm.), preferably 50–500 sq. m./gm.

The bauxitic materials which are naturally occurring impure alumina hydrates, such as bauxite and laterite, are a suitable source of surface-hydroxyl-containing adsorbent solids. The aluminous materials which contain substantial amounts, or even large amounts, of oxides other than aluminum oxide are suitable for use in preparing surface-hydroxyl-containing adsorbent to be conjoined with aluminum chloride and HCl. The synthetic material known as silica-alumina, which is used as a hydrocarbon cracking catalyst, is such a suitable aluminous material.

It is preferred to use alumina materials, synthetic or naturally-occurring, such as bauxite, as the surface-hydroxyl-containing adsorbent solid for preparation of the catalyst. Any adsorbent molecular water should be removed from the solid prior to contacting it with aluminum halide, lest the effectiveness of some of the aluminum chloride to form a catalyst be destroyed by reaction or hydration with the water. Adsorbed water can be removed by drying or calcining the solid; however, if calcination is used it should not be carried out under conditions of temperature and time so severe as to destroy the surface hydroxyl groups.

A convenient method of ascertaining whether adsorbed water is absent and an effective amount of surface hydroxyl groups is present in a particular adsorbent solid to be used in preparing catalyst is to determine the weight loss of the defined solid upon heating to about 1832° F. This weight loss is termed "loss on ignition" (LOI). It has been found that satisfactory surface-hydroxyl-containing adsorbent solids are those which contain little or no adsorbed molecular water and which lose about 2–10 weight percent, preferably 4–8 weight percent in the case of the aluminas and 2–6 percent in the case of silica gel, of their original weight upon being heated to about 1832° F. The weight loss in these ranges is due, almost entirely, to the destruction of surface hydroxyl groups with the consequent liberation of water.

The surface-hydroxyl-containing adsorbent solid for use in forming the catalyst is prepared in any manner providing a substantial portion of the effective surface in the hydroxyl form so that there are available hydroxyl groups for reaction with aluminum chloride. It is preferred that at least about 50 percent of the effective surface be in the hydroxyl form. Optimally, nearly all of the effective surface is in the hydroxyl form with no molecular water present.

A suitable method of producing a surface-hydroxyl-containing adsorbent solid is to calcine a silica and/or alumina containing material to produce an adsorbent solid containing at least one of the following adsorbent solid forms; silica gel, chi alumina, eta alumina, gamma alumina, or mixtures thereof such as silica-alumina. Suitable calcination conditions of time and temperature, e.g. a temperature in the range of about 300 to 1100° F. for a time in the range of about 1–24 hours, will produce an adsorbent solid having the required surface area and pore size properties and a LOI less than about 2–4 percent. Water, as liquid or vapor, is then added to the calcined adsorbent solid in the amount of about 1–5 weight percent or more. The added water is permitted to react with the surface of the adsorbent solid to produce surface hydroxyl groups. This hydrated adsorbent solid is then dried under carefully controlled conditions so that molecular water is removed without destroying an appreciable number of the surface hydroxyl groups. Suitable drying conditions are a temperature in the range of about 200–300° F. for a time of about 10–100 hours. Of course, if the adsorbent solid, such as bauxite for example, as received contains 8–10 percent or more of water, as determined by loss on ignition, the hydration step may be omitted.

The catalyst is formed by contacting aluminum chloride with the defined surface-hydroxyl-containing adsorbent solid and causing the aluminum chloride to react with the surface hydroxyl groups on the surface of the defined adsorbent solid, thus forming —O—AlCl$_2$ groups on the surface. During this reaction one mole of HCl is liberated for each mole of AlCl$_3$ reacted. HCl is caused to associate, mole for mole with the —O—AlCl$_2$ group to form the active catalyst. It is postulated that an

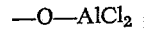

site, when associated with HCl, forms a proton and a negatively charged species (—O—AlCl$_3$), which constitutes the actual catalyst.

The aluminum chloride content corresponding to maximum catalyst activity is that amount of aluminum chloride required to provide a monolayer of reacted aluminum chloride molecules, i.e., reacted with hydroxyl groups to form —O—AlCl$_2$ groups, over the effective surface area of the defined adsorbent solid. One gram of aluminum chloride will provide a monolayer of aluminum chloride molecules (or —O—AlCl$_2$ groups) over about 534 square meters of effective surface area.

The preferred method of preparing the catalyst is to form a dry physical mixture of aluminum chloride and surface-hydroxyl-containing adsorbent solid and react the mixture at a temperature in the range of about 0–500° F., preferably about 200–350° F. Normally sufficient pressure is utilized to minimize sublimation of aluminum chloride from the reaction mixture to reduce aluminum chloride loss. A flowing stream of gas may be used as the heat transfer medium for heating the reaction mixture and cooling the reaction products. Hydrogen is a preferred gas, however other relatively unreactive gases such as nitrogen, helium, methane, ethane, propane, butane, etc. may also be used. The reaction time required decreases as the reaction temperature is increased. At the preferred reaction temperature of 200–350° F., a time of about 0.1 to 10 hours is normally sufficient to complete the reaction; however, longer reaction time is not detrimental. HCl is then caused to associate with the reaction product of aluminum chloride and surface-hydroxyl-containing adsorbent solid. This association is carried out at a temperature below about 180–200° F. since at higher temperature the association does not take place. In fact, a fully formed catalyst will liberate HCl if heated to a temperature of 180–200° F., or higher, even under pressure of 500 p.s.i. or more. The association with HCl is conveniently carried out by contacting the reaction product with anhydrous HCl at a pressure of about 10–500 p.s.i.a. and a temperature in the range of about 60–200° F. One mole of HCl associates for each mole of AlCl$_3$ which has reacted with the surface-hydroxyl-containing adsorbent solid. A time of about 1–100 hours is normally sufficient to complete the HCl association.

The most desirable ratio of aluminum chloride to the defined adsorbent solid depends upon the surface-hydroxyl content of the particular adsorbent solid used. For example, with surface-hydroxyl-containing adsorbent solid particles of about 20–60 mesh size and having an effective surface area of about 230 sq. m./gm., the proportions will normally be about 25–35 weight percent aluminum chloride and about 65–75 weight percent adsorbent solid. Most catalyst forming reaction mixtures comprise 10–50 weight percent aluminum chloride and 50–90 weight percent of the defined adsorbent solid. The catalyst can be prepared in a great number of particle sizes. The final catalyst configuration is determined by the configuration of the surface-hydroxyl-containing adsorbent solid used. The catalyst is hygroscopic, therefore care should be taken to avoid contacting the catalyst with moisture.

The regeneration process of the invention comprises treating the defined used catalyst with hydrogen gas at a temperature from about 150° F. to about 600° F. A hydrogen gas partial pressure is maintained from about 50 p.s.i. to about 3000 p.s.i. or more. The time of treatment with the hydrogen gas has a bearing upon the amount of catalyst activity restoration obtained. As was pointed out earlier, a particular catalyst may not be restorable to full fresh catalyst activity and thus treatment beyond this maximum restored activity point is ineffective. The time of treatment is particularly determined by the type of used catalyst and the conversion process in which the used catalyst was produced.

It is possible to obtain regeneration using hydrogen gas alone. It is to be understood that the term "hydrogen gas" includes not only pure hydrogen gas but hydrogen gas which contains amounts of inert gaseous diluents such as nitrogen, methane, ethane, and others which do not attack either the aluminum halide or the adsorbent material. Better regeneration, or equal regeneration at less drastic conditions, is obtainable by having hydrogen chloride present in the hydrogen gas stream.

The regeneration process may be carried out batch-wise in a closed vessel. In this batch-wise procedure, the used catalyst and hydrogen gas (with or without hydrogen halide) are maintained at the desired temperature and pressure for the desired time. The regeneration zone may be a separate vessel to which the used catalyst is transferred from the reactor or it may be the reactor itself which is sealed-off to provide a closed vessel.

The regeneration process may be carried out by flowing a stream of hydrogen gas (with or without hydrogen halide) through the mass of used catalyst. This is the preferred manner of regeneration in a process utilizing continuous flow of reactants.

In general, it has been observed that when hydrogen gas alone is utilized as the regenerating gas, higher temperatures and pressures are needed to obtain equivalent restoration of activity than when hydrogen chloride is present. This is particularly true in flow regeneration when hydrogen chloride adsorbed on the used catalyst tends to be stripped completely therefrom by the flowing stream of treating gas. It is preferred to operate with a hydrogen gas stream containing hydrogen chloride when regenerating in a continuous flow operation.

The used catalyst may be regenerated after having been stripped of hydrocarbon adsorbed thereon by an inert gas stream or the well-drained catalyst may be contacted with the treating gas and regeneration and stripping obtained simultaneously.

EXAMPLE I

The results of experiments showing that all adsorbent solids are not equivalent nor are all alumina materials equivalent for use in making the catalyst and that aluminum chloride alone is relatively inactive in our process are listed in the following Table I. An eta-alumina alone and HCl treated eta-alumina containing 5.12 wt. percent chloride alone are also shown to be inactive.

In each case where solid and aluminum chloride both were used the "catalyst" was prepared by forming a dry-mix of solid aluminum chloride with the solid being tested and contacting this mixture with liquid, saturated hydrocarbon at 75–125° F. HCl was associated with the catalyst in each test except Test 14 which shows the necessity for HCl association in order to produce a catalyst having significant activity. The catalyst was tested for activity in catalyzing the isomerization of hexane isomers to produce 2,2-dimethylbutane (2,2–DMB) commonly called neohexane. Neohexane is a valuable gasoline blending component having good volatility characteristics, a clear Research octane number of 91.8 and a clear Motor octane number of 93.4. The isomerization was carried out at a temperature of 122° F. in small stirred batch reactors a reaction time of 3 to 4 hours, except Test 14 which was tested in a flow run at 0.2 weight hourly space velocity (WHSV) and 75° F. Other tests have shown that results obtained in tests of this type give conversions comparable to the batch tests. The products were analyzed by gas chromotography. Other experiments have shown that near maximum conversion is obtained in these batch tests in 3 hours under the conditions used.

The 2,2–DMB conversion reported is the concentration of neohexane in the hexane fraction of the product, excluding cyclohexane which was used in the feed in a concentration of about 10 weight percent to inhibit cracking of hexanes to lighter products. The cyclohexane did not undergo appreciable reaction during the tests. In each case, except in the charcoal tests where 2-methylpentane was used, the feed material was a saturated hexane fraction of catalytic reformate. In Tests 1 and 2, aluminum trihydrate was the alumina-containing starting material which was then calcined to the indicated LOI, thus the solid actually used in preparing the catalyst was gamma alumina.

TABLE I

| Test No. | Solid Tested | LOI Wt. Percent | Aluminum chloride, Wt. Percent of total solids | 2,2-IMB Conversion, Wt. Percent |
|---|---|---|---|---|
| 1 | Alumina trihydrate | 9.9 | 50 | 47.6 |
| 2 | do | 4.7 | 50 | 47.8 |
| 3 | Eta alumina | 2.6 | 30 | 48.6 |
| 4 | Silica gel | 2.9 | 25 | 47.1 |
| 5 | Silica-alumina [1] | 1.4 | 30 | 35.6 |
| 6 | Gamma alumina | 4.0 | 25 | 39.6 |
| 7 | Alpha alumina | Nil | 50 | 1.5 |
| 8 | Adsorbent charcoal | | 50 | 13.5 |
| 9 | Aluminum chloride | | 100 | 8.0 |
| 10 | Bauxite | 3.5 | 20 | 36.5 |
| 11 | Chi alumina | [2] 3 | 20 | 43.9 |
| 12 | Eta alumina alone | 6.0 | 0 | 0 |
| 13 | HCl treated eta alumina containing 5.12 wt. percent C. | [3] 5.8 | 0 | 0 |
| 14 | Eta alumina | [2] 1.2 | 25 | [4] 9.5 |

[1] 86% silica, 14% alumina.
[2] Estimated.
[3] Before HCl treatment.
[4] Catalyst material not associated with HCl, tested in flow run at 0.2 WHSV and 75° F.

EXAMPLES II–V

The regeneration process is illustrated by the following working examples. In all of these examples, the catalyst consisted of aluminum chloride positioned on either a synthetic activated alumina or activated Arkansas bauxite. In all instances, the fresh catalyst was prepared by forming a dry-mix from aluminum trichloride and the surface-hydroxyl-containing adsorbent solid material; the dry-mix was then contacted with (1) a flowing stream of a natural mixture of hexanes including about 10 mole percent of cyclohexane and methyl cyclopentane or (2) n-butane-dependent upon the hydrocarbon to be isomerized with the catalyst, at about the isomerization temperature. The fresh catalyst was then used to isomerize the particular hydrocarbon feed at liquid phase conditions until the catalyst activity had reached a given point as determined by the content of dimethylbutanes or isobutane in the effluent stream.

EXAMPLE II

In this example, the fresh catalyst contained 80 weight percent of activated alumina of 20–60 mesh size and 20 weight percent of technical grade aluminum chloride. The isomerization was carried out under intermittent flow conditions. The reactor was a metal pipe 1 inch internal diameter and providing 3 feet of catalyst bed height. Means were provided for maintaining the reactor at the desired temperature. The hexane feed was introduced up-flow along with 2–3 weight percent of hydrogen chloride. The feed and the reactor were maintained at about 80° F. and the weight hourly space velocity (w./hr./wc.) was held at 0.1. The composition of the feed and of the product was determined by gas chromatography. The activity of the catalyst and its decline rate was determined by the total amount of dimethyl butane present in the hexane portion, not including cycloparaffins, of the product stream. In this example, feed was flowed through the catalyst bed for 8 hours; the flow was then stopped and liquid hydrocarbon held in the reactor for 16 hours— this sequence was counted as 1 day. Comparative tests between this intermittent flow operation and true continuous flow show that accurate and adequate comporisons of catalysts are obtained by this method of operation.

At day 2 the effluent from run using fresh catalyst contained 65% of DMB. After 17 days of operation the DMB content had dropped to 38% at 80° F. At that time, temperature was increased to 105° with an increase in conversion to about 50%. The run was continued to day 33 at which time the DMB content had decreased to 40%.

The reactor was drained and the liquid stripped from the used catalyst with nitrogen gas. The catalyst was removed from the reactor and put into a bomb. The bomb was pressured with cylinder hydrogen to 500 p.s.i.g. and heated to 300° F., where the pressure was 700 p.s.i.g.; and the bomb was maintained at 300° F. for 20 hours. At the end of this time, the treated catalyst was returned to the intermittent flow reactor and operation begun at the same conditions as used for fresh catalyst. Initial conversion was at 57% DMB in the product. Activity decreased and toward the end of day 9 the DMB content was 45%.

At this point, the used catalyst was treated in the reactor itself. The catalyst was stripped of hydrocarbon. The reactor was closed and pressured to 500 p.s.i.g. with cylinder hydrogen. Then for 20 hours the reactor was maintained at 300° F. and a pressure of 700 p.s.i.g. At the end of this time the hydrogen was released and feed introduced into the reactor under the conditions of fresh catalyst usage. The initial conversion was 57% DMB in the product. At day 9 the activity had decreased to 47% when the run was terminated.

This example illustrates regeneration of used catalyst in operation without the use of added hydrogen chloride. The example shows that regenerated catalyst of substantially the same activity as a fresh catalyst may be produced by hydrogen treatment under these conditions.

EXAMPLE III

In this illustration, regeneration was studied on catalyst obtained by isomerizing the natural mixture of hexanes utilizing a large size fixed bed unit. The reactor section was 16 feet tall and 2 inches in internal diameter. The reactor was provided with heating means for maintaining temperatures over a broad range including a temperature gradient along the height of the reactor.

The fresh catalyst was prepared from calcined alumina which had been washed with hydrochloric acid prior to calcining. Eighty parts by weight of this 20–60 mesh activated alumina and 20 parts by weight of powdered technical grade aluminum trichloride were mixed and charged to the reactor. The catalyst was formed in place by introducing feed hexanes at ordinary isomerization temperature of 95° F. The isomerization reaction was carried out at a temperature of about 95° F., at a pressure of 210 p.s.i.g., a weight hourly space velocity of 0.1, and a feed rate of about 1.6 pounds per hour. Before the feed hexanes were introduced into the reactor, they were passed through a vessel containing aluminum trichloride which acted as a feed saturator. About 4 weight percent of HCl was introduced with the feed to act as catalyst promoter. Hereinafter, HCl in the feed is to be understood as weight percent thereon. At hour 8, the product effluent contained 60% of dimethyl butanes. The run was continued for 170 hours, at which time the product effluent contained 55% of DMB.

The used catalyst was regenerated by flowing hydrogen gas 2 SCFH of hydrogen per pound of catalyst, containing 10 volume percent hydrogen chloride, through the catalyst bed at a temperature of 260° F. for a time of 24 hours, at a pressure of 425 p.s.i.g. Hereinafter, it is to be understood that the amount of HCl present in the hydrogen gas is volume percent thereon. The regenerated catalyst was then placed on oil under the conditions of fresh catalyst usage. At hour 9, 59% of DMB was present in the product hexanes. The run was continued for 120 hours, at which time the DMB content of the hexane product was 53%.

A second regeneration was carried out at 260° F. for 24 hours at 425 p.s.i.g. with hydrogen and 10% hydrogen chloride flowing upward through the catalyst bed. The second regenerated catalyst had an initial DMB product of 59% and the final DMB product after 63 hours was 58%.

A third regeneration was carried out down flow with hydrogen gas containing 1% of HCl. The treating was at 325° F. for 36 hours at 425 p.s.i.g. When the third regenerated catalyst was placed back on oil, the initial DMB product was 53% of the hexane product and 48% after 111 hours.

A fourth regeneration was carried out using hydrogen containing 1% of HCl. The treating was at a temperature of 450° F. for 12 hours at 425 p.s.i.g. This fourth regenerated catalyst had an initial DMB product of 60% and, after 135 hours on oil, a DMB product of 50%.

A fifth regeneration was carried out with results on oil essentially identical to those of the fourth regenerated catalyst.

A sixth regeneration was carried out with hydrogen containing 1% of hydrogen chloride at a temperature of 375–400° F., a pressure of 425 p.s.i.g., and a time of 6 hours.

The sixth regeneration catalyst had an initial DMB product of 58%, at a weight hourly space velocity 0.07. At 51 hours, the DMB product was 54% and a weight hourly space velocity of 0.1. The run was terminated at hour 97 with a DMB product of 45% at a weight hourly space velocity of 0.11.

Another regeneration was carried out with hydrogen containing 1% of HCl at a temperature of 380–400° F., a pressure of 250 p.s.i.g., and 12 hours time. The seventh regeneration catalyst had an initial DMB product of 59% and at the termination of the run at hour 87 a DMB product of 46%.

An eighth regeneration was made with hydrogen containing 2 volume percent of HCl at a temperature of 380–400° F., 425 p.s.i.g., and a time of 12 hours. The eighth regeneration catalyst had an initial DMB product of 57% and at hour 111 a DMB product of 43%.

This example shows that in a large size research operation catalyst can be effectively regenerated for at least 8 times with the regenerated catalyst providing activity substantially that of fresh catalyst.

EXAMPLE IV

This example illustrates regeneration of a catalyst utilizing activated Arkansas bauxite as the adsorbent material. The bauxite was washed with hydrochloric acid and calcined at 900° F. for approximately 14 hours. The catalyst was prepared by the dry-mix technique using 30% of aluminum trichloride and 20–60 mesh bauxite. The reactor, the feed, and the mode of operation are those shown in Example II above. The isomerization was carried out at 80° F. Six regenerations were carried out. All of these were carried out batch-wise in the reactor itself at a temperature of 300° F. using cylinder hydrogen and a pressure of 700 p.s.i.g. No attempt was made to terminate at a particular conversion at a given DMB contents of each run, the days of operation, and the regeneration number are set out in the table below.

TABLE

| Catalyst | Days of Operation | DMB in Hexane Product | |
|---|---|---|---|
| | | Initial | Final |
| Fresh Catalyst | 4 | 56.3 | 38.9 |
| I regeneration | 10 | 62.7 | 53.8 |
| II regeneration | 9 | 62.3 | 40.0 |
| III regeneration | 11 | 62.7 | 38.6 |
| IV regeneration | 9 | 61.3 | 42.3 |
| V regeneration | 10 | 60.9 | 42.0 |
| VI regeneration | 2 | 62.8 | |

This example shows that bauxite adsorbent is particularly amenable to static regeneration without added HCl at moderate treatment conditions.

EXAMPLE V

This example illustrates the regeneration of used catalyst from the isomerization of n-butane. The reactor used in the preparation of the used catalyst and testing of regenerated catalyst is similar to that described in Example II. The fresh catalyst was prepared from 20-60 mesh Arkansas bauxite, 80%, and aluminum trichloride, 20%. The catalyst was prepared by the dry-mix procedure. Commercial technical grade n-butane was the feed to the process. About 5% of HCl was added with the butane as promoter. The operation was carried out at liquid phase conditions at 140° F., 250 p.s.i.g., and a weight hourly space velocity equivalent of 0.1. The peak isobutane content in the butane product was 68 weight percent. This run was terminated about 70 days operation with the isobutane content of the butane product at 56%.

A static regeneration was made with cylinder hydrogen at 700 p.s.i.g. for 24 hours at a temperature of 300° F. The unit was placed back on stream with the regenerated catalyst and the initial isobutane content of the butane product was 65%. After 44 days, the isobutane content of the butane product was 60%.

Thus having described the invention, what is claimed is:

1. A catalyst regeneration process which comprises treating a used-catalyst of the type consisting essentially of aluminum chloride reacted with hydroxyl groups of surface hydroxyl-containing adsorbent solid, which used-catalyst possesses catalytic activity less than fresh catalyst of this type owing to use in a conversion process involving a hydrocarbon feed, with hydrogen gas at a temperature in the range of about 150-600° F., a hydrogen partial pressure of at least about 50 p.s.i., and for a time in the range of about 6 to 72 hours which time is sufficient to obtaining regenerated catalyst possessing substantially greater activity for hydrocarbon conversion than possessed by said used catalyst.

2. The process of claim 1 wherein said gas includes hydrogen chloride.

3. The process of claim 1 wherein said adsorbent is selected from the class consisting of silica gel, chi alumina, eta alumina, gamma alumina, and mixtures thereof.

4. The process of claim 2 wherein said gas includes about 0.1-10 volume percent of hydrogen chloride.

5. The process of claim 4 wherein said temperature is in the range of about 200-400° F. and said pressure is in the range of about 200-800 p.s.i.

6. In a hydrocarbon conversion process wherein saturated hydrocarbon feed is contacted with a particulate, solid catalyst consisting essentially of aluminum chloride reacted with hydroxyl groups of surface-hydroxyl-containing adsorbent solid, in the presence of hydrogen chloride, under conditions to obtain hydrocarbon conversion reaction, and wherein said catalyst undergoes an activity decrease during said conversion reaction, the improvement which comprises discontinuing hydrocarbon conversion over said catalyst, treating said catalyst of decreased activity with hydrogen gas, at a temperature of from about 150° F. to about 450° F., at a hydrogen gas pressure of from about 50 p.s.i. to about 3000 p.s.i., for a time in the range of about 6 to 72 hours to obtain a treated catalyst having significantly better catalytic activity than said catalyst of said decreased activity and resuming hydrocarbon conversion over said catalyst to obtain said better catalytic activity as a result of said treating.

7. The process of claim 6 wherein said improvement utilizes hydrogen chloride concurrently with said hydrogen.

8. The process of claim 7 wherein said hydrogen chloride comprises about 0.1-15 volume percent of the treating gas.

9. The process of claim 8 wherein said surface-hydroxyl-containing adsorbent solid is selected from the class consisting of silica gel, chi alumina, eta alumina, gamma alumina, and mixtures thereof.

10. The process of claim 8 wherein said hydrocarbon conversion reaction is isomerization and said feed consists essentially of $C_4$-$C_8$ paraffinic and cycloparaffinic hydrocarbons.

11. The process of claim 10 wherein said paraffinic hydrocarbon is hexane.

12. The process of claim 10 wherein said paraffinic hydrocarbon includes a cycloparaffin containing 5-9 atoms.

References Cited

UNITED STATES PATENTS

| 2,293,891 | 8/1942 | Evering et al. | 252—411 X |
| 2,300,235 | 10/1942 | Pines et al. | 260—683.74 |
| 2,323,830 | 7/1943 | McMillan | 252—411 |
| 2,443,608 | 6/1948 | Evering et al. | 260—683.74 |
| 3,221,002 | 11/1965 | Orzechowski et al. | 252—463 |

OTHER REFERENCES

Russell, Alumina Properties, Alcoa Technical Paper No. 10, Pittsburgh, Pa., 1953, pp. 16, 17, and 30.

DELBERT E. GANTZ, Primary Examiner.

PAUL M. COUGHLAN, Examiner.

R. H. SHUBERT, Assistant Examiner.

UNITED STATES PATENT OFFICE
CERTIFICATE OF CORRECTION

Patent No. 3,352,941            November 14, 1967

William Schoen et al.

It is certified that error appears in the above identified patent and that said Letters Patent are hereby corrected as shown below:

Column 6, TABLE I, third column, line 1 thereof, "9.9" should read -- 8.9 --; same TABLE I, second column, line 15 thereof, "C." should read -- C1 --. Column 9, line 37, "about" should read -- after --.

Signed and sealed this 18th day of November 1969.

(SEAL)
Attest:

Edward M. Fletcher, Jr.
Attesting Officer

WILLIAM E. SCHUYLER, JR.
Commissioner of Patents